(12) United States Patent
Xue et al.

(10) Patent No.: US 12,506,584 B2
(45) Date of Patent: Dec. 23, 2025

(54) SYSTEMS AND METHODS FOR PHYSICAL UPLINK SHARED CHANNEL (PUSCH) OCCASION VALIDATION FOR 2-STEP RANDOM ACCESS CHANNEL (RACH)

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Jing Lei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 17/068,585

(22) Filed: Oct. 12, 2020

(65) Prior Publication Data

US 2021/0112603 A1    Apr. 15, 2021

Related U.S. Application Data

(60) Provisional application No. 62/914,757, filed on Oct. 14, 2019.

(51) Int. Cl.
*H04L 5/14* (2006.01)
*H04W 74/0833* (2024.01)
*H04W 74/0836* (2024.01)

(52) U.S. Cl.
CPC ........... *H04L 5/14* (2013.01); *H04W 74/0833* (2013.01); *H04W 74/0836* (2024.01)

(58) Field of Classification Search
CPC ........... H04W 74/0833; H04W 74/006; H04W 72/1268; H04L 5/14; H04L 5/0044; H04L 5/0053
See application file for complete search history.

(56) References Cited

U.S. PATENT DOCUMENTS

| | | | |
|---|---|---|---|
| 2019/0132882 A1 | 5/2019 | Li et al. | |
| 2020/0100297 A1* | 3/2020 | Agiwal | H04W 52/365 |
| 2021/0022143 A1* | 1/2021 | Xiong | H04L 5/10 |
| 2021/0051672 A1* | 2/2021 | Rastegardoost | H04W 72/21 |
| 2022/0053577 A1* | 2/2022 | Chai | H04W 72/0446 |
| 2022/0201766 A1* | 6/2022 | Gao | H04W 74/0833 |
| 2022/0408478 A1* | 12/2022 | Christoffersson | H04W 74/0833 |
| 2023/0094704 A1* | 3/2023 | Ohara | H04W 74/0836 370/329 |

OTHER PUBLICATIONS

Nokia "Considerations on 2-step RACH channel structure", 3GPP R1-1908341, Aug. 26-30, 2019 (Year: 2019).*

(Continued)

*Primary Examiner* — Chuong M Nguyen
(74) *Attorney, Agent, or Firm* — Harrity & Harrity, LLP

(57) ABSTRACT

Wireless communications systems and methods are provided for validating a physical uplink shared channel (PUSCH) occasion defined for 2-step random access channel (RACH) in case of collisions. For example, the user equipment (UE) may determine whether a collision occurs between the PUSCH occasion for the 2-step RACH and any RACH occasion assigned for either 2-step RACH or 4-step RACH after receiving the RACH configuration or updates from the network. The UE may then exclude the PUSCH occasion from the resource pool for 2-step RACH when a collision occurs.

27 Claims, 10 Drawing Sheets

(56) References Cited

OTHER PUBLICATIONS

ZTE "FL Summary #2 of Channel Structure for 2-step RACH", 3GPP R1-1909860, Aug. 26-30, 2019 (hereinafter "ZTE") (Year: 2019).*
Samsung "Channel Structure for Two-Step RACH", 3GPP R1-1910453, Oct. 14-20, 2019 (Year: 2019).*
ZTE "FL Summary #2 of Channel Structure for 2-step RACH", 3GPP R1-1909860, Aug. 26-30, 2019 (Year: 2019).*
International Search Report and Written Opinion—PCT/US2020/055413—ISA/EPO—Dec. 14, 2020.
Samsung: "Channel Structure for Two-Step RACH", 3GPP Draft, 3GPP TSG RAN WG1 #98bis, R1-1910453, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 5, 2019 (Oct. 5, 2019), XP051808579, 14 pages, Retrieved from the Internet: URL: https://ftp.3gpp.org/tsg_ran/WG1_RL1/TSGR1_98b/Docs/R1-1910453.zip R1-1910453.DOCX [retrieved on Oct. 5, 2019] sections 2.2, 2.3.
Samsung: "Discussion on PUSCH Validation and Overlapping Handling", 3GPP Draft, 3GPP TSG RAN WG1 #98bis, R1-1910455, 3rd Generation Partnership Project (3GPP), Mobile Competence Centre, 650, Route Des Lucioles, F-06921, Sophia-Antipolis Cedex, France, vol. RAN WG1, No. Chongqing, China: Oct. 14, 2019-Oct. 20, 2019, Oct. 5, 2019 (Oct. 5, 2019), XP051808581, 3 pages, Retrieved from the Internet: URL: https://ftp.3gpp.org/tsg_ran/WG1_RL1/TSGR1_98b/Docs/R1-1910455.zip R1-1910455.DOCX [retrieved on Oct. 5, 2019] section 2.
ZTE: "FL Summary #2 of Channel Structure for Two-step RACH", 3GPP Draft, R1-1909860, FL Summary #2 of Channel Structure for Two-step RACH (7.2.1.1), 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019 (Sep. 3, 2019), XP051766452, 38 pages, Retrieved from the Internet: URL: http://www.3gpp.org/ftp/tsg_ran/WG1_RL1/TSGR1_98/Docs/R1-1909860.zip. [retrieved on Sep. 3, 2019] Sect. 2.1.1.
ZTE, et al., "Remaining Issues of msgA Channel Structure", 3GPP Draft, 3GPP TSG RAN WG1 #98bis ,R1-1910002 Remaining Issues of msgA Channel Structure, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051808065, 26 pages, Retrieved from the Internet: URL: https://ftp.3gpp.org/tsg_ran/WG1_RL1/TSGR1_98b/Docs/R1-1910002.zip R1-1910002 Remaining issues of msgA channel structure. docx [retrieved on Oct. 4, 2019] the whole document.
Taiwan Search Report—TW109135390—TIPO—Mar. 24, 2024.

* cited by examiner

SYSTEMS AND METHODS FOR PHYSICAL UPLINK SHARED CHANNEL (PUSCH) OCCASION VALIDATION FOR 2-STEP RANDOM ACCESS CHANNEL (RACH)

PRIORITY CLAIMS

This application is a non-provisional of and claims priority under 35 U.S.C. 119 to U.S. Provisional Application No. 62/914,757, filed on Oct. 14, 2019, which is hereby expressly incorporated by reference herein in its entirety.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

In a wireless system, BSs may broadcast synchronization signals such as primary synchronization signal (PSS), secondary synchronization signal (SSS), and extended synchronization signal (ESS), beam reference signal (BRS) and system information in a plurality of directional beams. In addition, the BSs may transmit other reference signals, such as channel state information reference signal (CSI-RS), over the beams to enable UEs to measure channels between the BS and corresponding UEs. A UE may perform initial cell acquisition by listening to the broadcast signals and perform signal measurements based on the synchronization signals, the BRS and/or other signals. The UE may determine receive signal strengths based on the received signals and select a cell and a beam within the selected cell for performing an access procedure.

To perform an access procedure, a UE may initiate a random-access channel (RACH) procedure by sending a random-access preamble using the same subarray and beam direction as the selected beam and monitor for a random-access response (RAR) in a RAR window. Traditionally, a 4-step RACH procedure is used to configure the connection between the UE and the BS, for example, as defined in the New Radio (NR) Release-15 and/or earlier versions of the NR Release. In NR Release-16, a 2-step RACH procedure is defined, in which a MsgA transmitted from the UE to the BS combines the Msg1 and Msg3 in the 4-step RACH procedure, and a MsgB transmitted from the BS to the UE combined the Msg2 and Msg4 in the 4-step RACH procedure. With only 2 message exchanges instead of 4, the 2-step RACH procedure may be more advantageous in latency reduction compared to the traditional 4-step RACH procedure. As a UE designed under NR Release-16 is expected to support both the 2-step RACH and the 4-step RACH, existing specification in the NR Release-16 adopts some existing resource allocation tables that were designed for the 4-step RACH to define transmission occasions for MsgA in the 2-step RACH. In this case, the transmission occasion allocated for the 4-step RACH may collide with the transmission occasion allocated for the 2-step RACH.

Therefore, there is a need to manage the transmission occasions for a UE that is compatible with both the 4-step RACH and the 2-step RACH in wireless communication systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication is provided. The method includes receiving, at a user equipment (UE) from a base station (BS), a first configuration of a first random-access channel (RACH) occasion or a first physical uplink shared channel (PUSCH) occasion for a first RACH procedure and a second configuration of a second RACH occasion for a second RACH procedure. The method further includes determining whether the first PUSCH occasion or the first RACH occasion is valid. The method further includes updating a RACH resource pool by excluding the first PUSCH occasion or the first RACH occasion from the RACH resource pool in response to determining that the first PUSCH occasion or the first RACH occasion is invalid, and transmitting, to the BS, a first RACH message using available PUSCH occasions and available RACH occasions from the updated RACH resource pool.

In another aspect of the disclosure, a UE of wireless communication is disclosed. The UE includes a transceiver configured to receive, from a BS, a first configuration of a first RACH occasion or a first PUSCH occasion for a first RACH procedure and a second configuration of a second RACH occasion for a second RACH procedure. The UE further includes a processor configured to determine whether the first PUSCH occasion or the first RACH occasion is valid, and update a RACH resource pool by excluding the first PUSCH occasion or the first RACH occasion from the RACH resource pool in response to determining that the first PUSCH occasion or the first RACH occasion is invalid. The transceiver is further configured to transmit, to the BS, a first RACH message using available PUSCH occasions and available RACH occasions from the updated RACH resource pool.

In another aspect of the disclosure, a processor-readable non-transitory storage medium storing processor-executable instructions for a user equipment (UR) of wireless communication is disclosed. The instructions are executable by a processor to perform operations comprising receiving, at a UE from a BS, a first configuration of a first RACH occasion or a first PUSCH occasion for a first RACH procedure and a second configuration of a second RACH occasion for a second RACH procedure, determining whether the first PUSCH occasion or the first RACH occasion is valid, updating a RACH resource pool by excluding the first PUSCH occasion or the first RACH occasion from the RACH resource pool in response to determining that the first PUSCH occasion or the first RACH occasion is invalid, and transmitting, to the BS, a first RACH message using available PUSCH occasions and available RACH occasions from the updated RACH resource pool.

In another aspect of the disclosure, a system of wireless communication is disclosed. The system includes means for receiving, at a user equipment (UE) from a base station (BS), a first configuration of a first random-access channel (RACH) occasion or a first physical uplink shared channel (PUSCH) occasion for a first RACH procedure and a second configuration of a second RACH occasion for a second RACH procedure. The system further includes means for determining whether the first PUSCH occasion or the first RACH occasion is valid. The system further includes means for updating a RACH resource pool by excluding the first PUSCH occasion or the first RACH occasion from the RACH resource pool in response to determining that the first PUSCH occasion or the first RACH occasion is invalid. The system further includes means for transmitting, to the BS, a first RACH message using available PUSCH occasions and available RACH occasions from the updated RACH resource pool.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
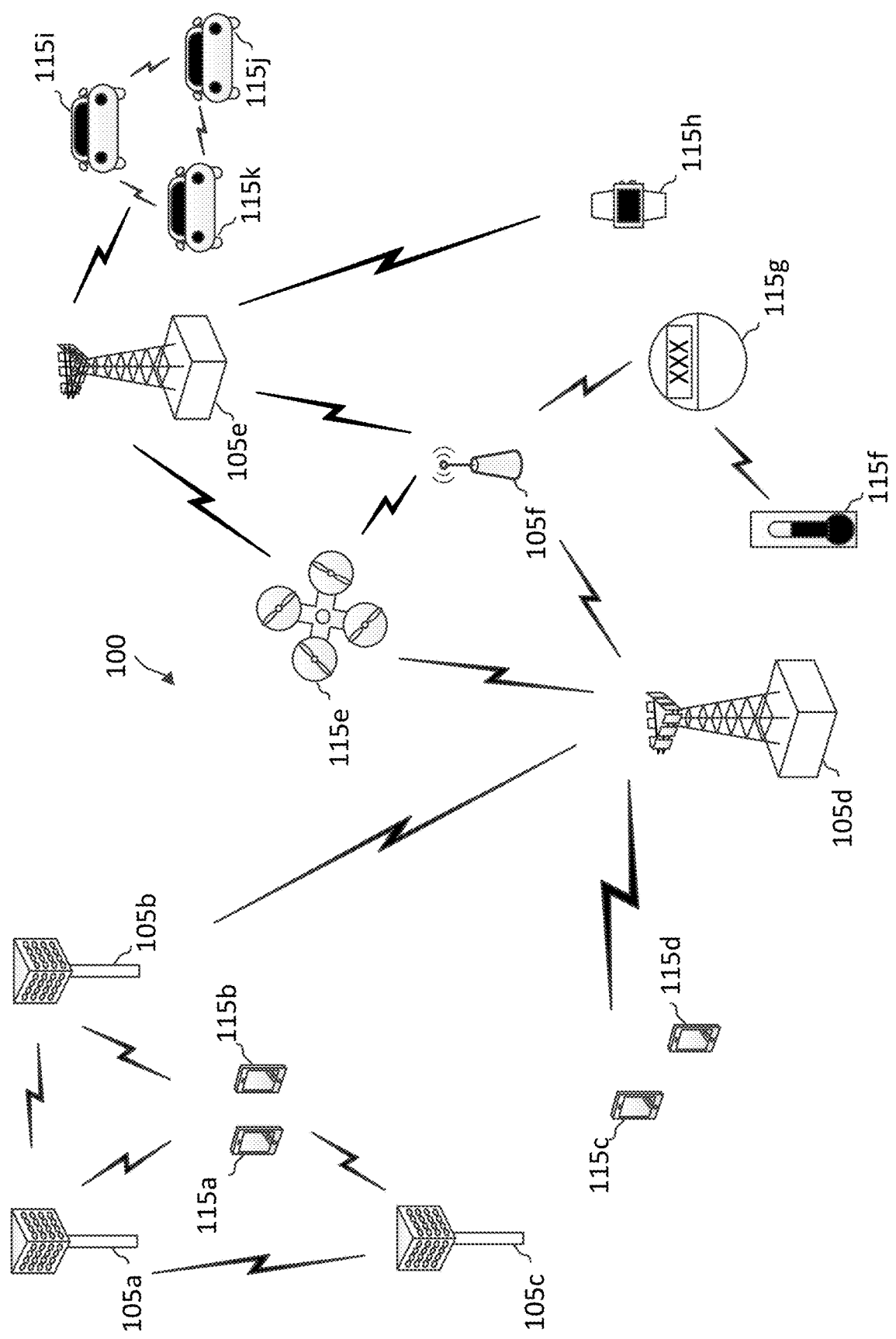
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless system, when a UE wants to access the network, the UE may attempt to try to attach or synchronize with the BS. In order to be synchronized with the network, a RACH procedure is used. For example, traditionally, a 4-step RACH procedure is used for UE to establish a synchronized connection with BS. Specifically, in system information block (SIB2), BS such as the next generation node B (gNB) periodically broadcasts several parameters such as root sequence ID, RACH configuration index, power offset, and initial power. In a contention-based RACH procedure, the UE randomly selects a preamble out of the 54 orthogonal zadoff-chu (ZC) sequences generated by root sequence cyclic shift, which is transmitted as Msg 1 on the random access subframe in time and resource block (RB) in frequency implicitly defining the RA-radio network temporary identifier (RA-RNTI). The gNB responds with Msg 2 random access response (RAR) containing a temporary cell-RNTI (C-RNTI), timing advance (TA) and uplink resource grant upon Msg 1 success. In Msg 3, the UE transmits a radio resource control (RRC) connection request including a randomly chosen initial device identity after decoding the RB assignment from Msg 2. Multiple UEs can select the same preamble, RA-RNTI in Msg 1 and also the corresponding C-RNTI in Msg 2 and transmit their own Msg 3 on the uplink resources which is detected as a collision by gNB. In Msg 4, the gNB sends RRC connection setup with a permanent C-RNTI and an echo of the initial identity transmitted in Msg 3 by the device. RACH procedure is considered as a success if the identities are matched else the device retries the procedure after a back-off interval. The successful UE is ready to transmit uplink data.

Figure 3:
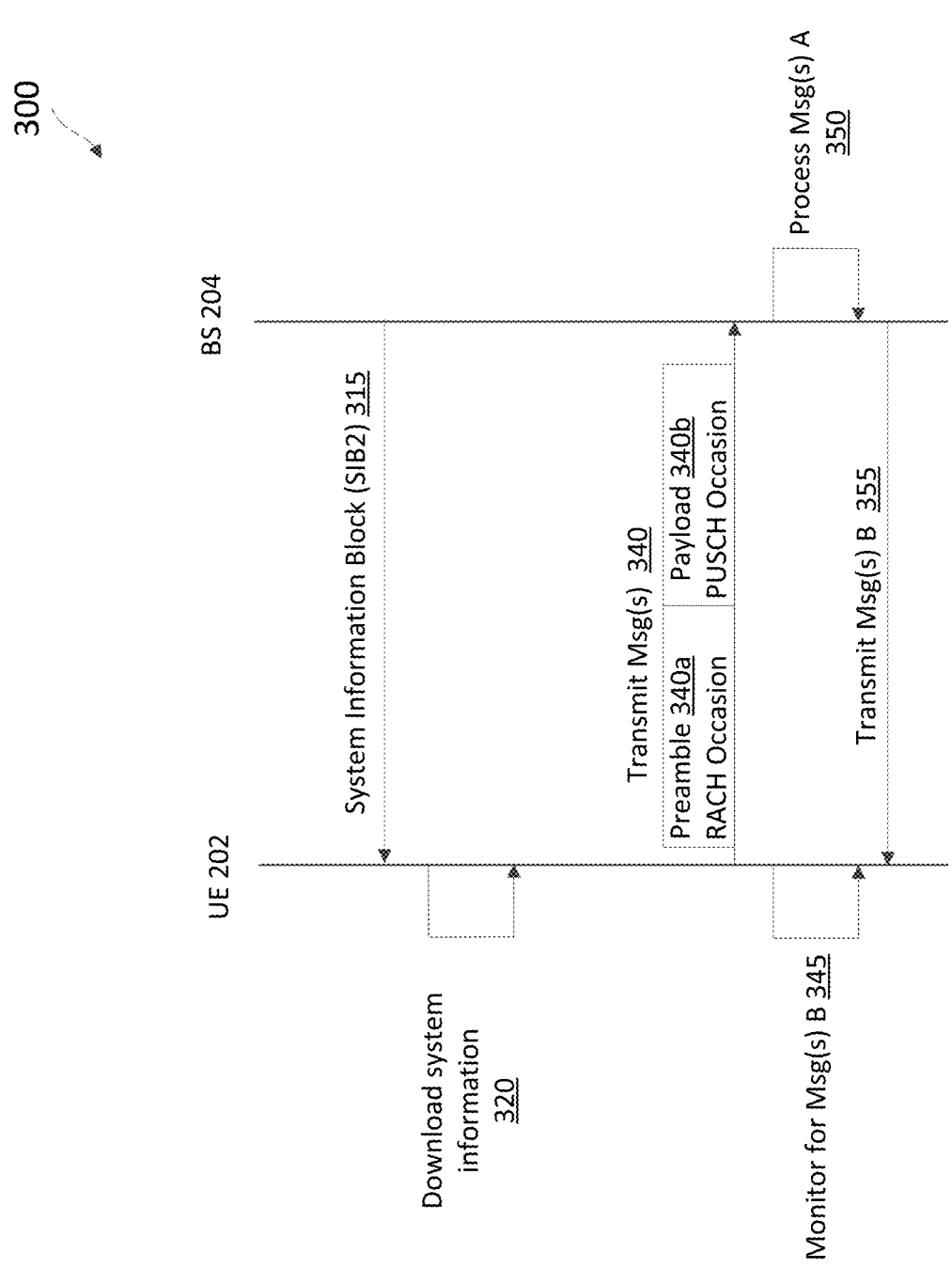
FIG. 3 illustrates a transmission scenario of a 2-step RACH scheme between a UE and a BS that may be implemented in the wireless communication network shown in FIGS. 1-2, according to some aspects of the present disclosure.

To lower the access delay of the 4-step RACH access procedure, a 2-step RACH procedure can be used, in which the UE combines Msg1 and Msg3 into one initial message, referred to as "MsgA," and the BS in turn responds with a combined message of the traditional Msg2 and Msg4, referred to as "MsgB." In accordance with aspects of the present disclosure, the 2-step RACH procedure, as further described in relation to FIG. 3, transmits a random-access preamble of MsgA over a RACH occasion, and a payload of MsgA over a PUSCH occasion. The RACH occasion and/or the PUSCH occasion for the 2-step RACH is defined by the network and transmitted to the UE via remaining system information (RMSI), other system information (SI) or radio resource control (RRC) messages.

As a UE designed under NR Release-16 is expected to support both the 2-step RACH and the 4-step RACH, existing specification in the NR Release-16 adopts some existing resource allocation tables that were designed for the 4-step RACH to define transmission occasions for MsgA in the 2-step RACH. In this case, the transmission occasion allocated for the 4-step RACH may collide with the transmission occasion allocated for the 2-step RACH.

In view of the need to manage the transmission occasions, embodiments described herein, as further described in relation to FIGS. 6-11, provide ways to validate a PUSCH occasion defined for 2-step RACH in case of collisions. For example, the UE may determine whether a collision occurs between the PUSCH occasion for the 2-step RACH and any RACH occasion assigned for either 2-step RACH or 4-step RACH after receiving the RACH configuration or updates from the network. The UE may then exclude the PUSCH occasion from the resource pool for 2-step RACH when a collision occurs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random-access procedure to establish a connection with the BS 105. In some examples, the random-access procedure may be a four-step random access procedure. For example, the UE 115 may transmit a random-access preamble and the BS 105 may respond with a random-access response. The random-access response (RAR) may include a detected random-access preamble identifier (ID) corresponding to the random-access preamble, timing advance (TA) information, a UL grant, a temporary cell-radio network temporary identifier (C-RNTI), and/or a backoff indicator. Upon receiving the random-access response, the UE 115 may transmit a connection request to the BS 105 and the BS 105 may respond with a connection response. The connection response may indicate a contention resolution. In some examples, the random-access preamble, the RAR, the connection request, and the connection response can be referred to as message 1 (MSG1), message 2 (MSG2), message 3 (MSG3), and message 4 (MSG4), respectively. In some examples, the random-access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
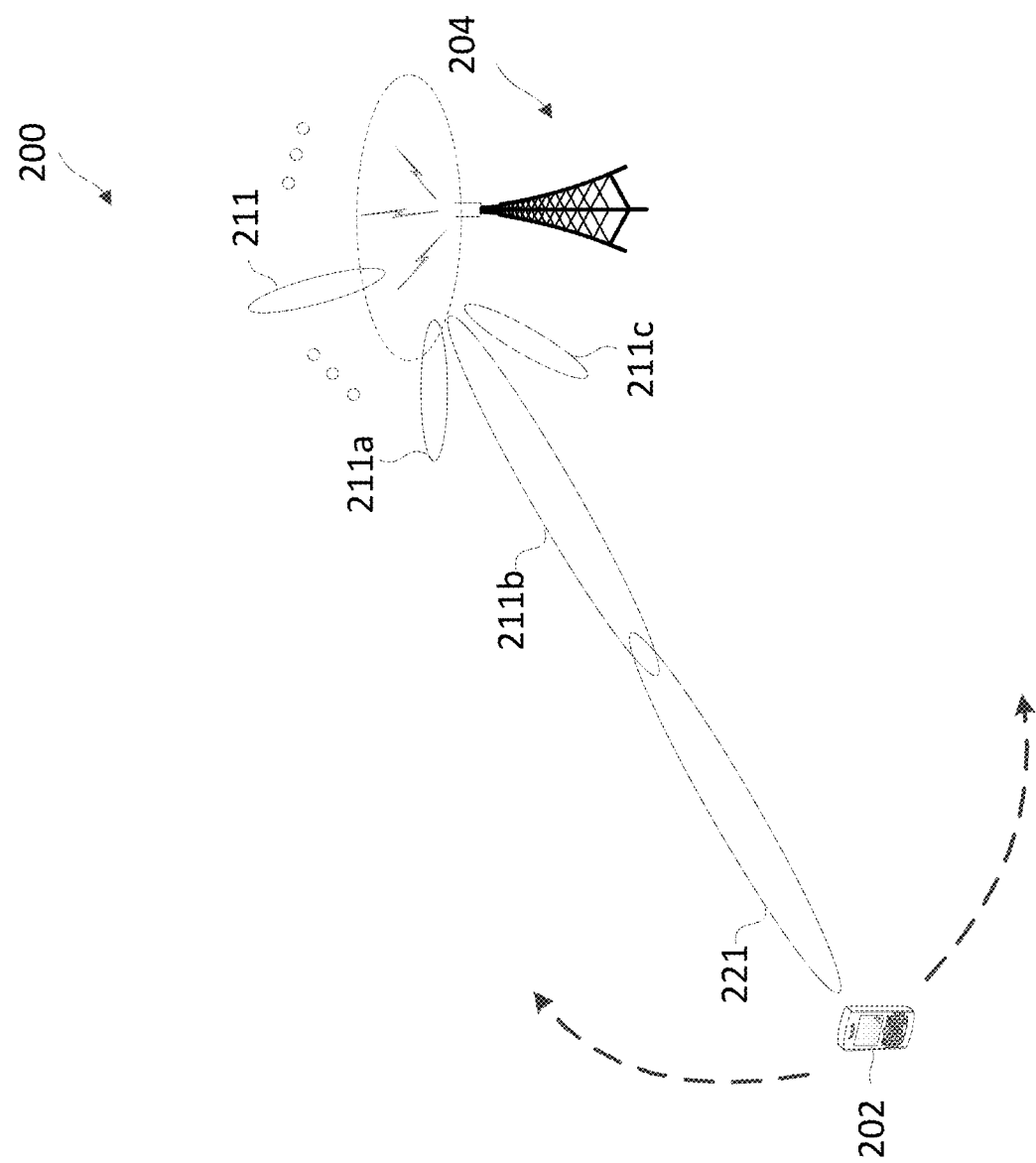
FIG. 2 illustrates a random-access scheme in the wireless communication network shown in FIG. 1, according to aspects of the present disclosure.

FIG. 2 illustrates a random-access scheme in a wireless communication network 200 according to aspects of the present disclosure. The network 200 corresponds to a portion of the network 100. FIG. 2 illustrates one BS 204 and one UE 202 for purposes of simplicity of discussion, though it will be recognized that aspects of the present disclosure may scale to many more UEs 202 and/or BSs 204. The BS 204 corresponds to one of the BSs 104. The UE 202 corresponds to one of the UEs 102. The UE 202 and BS 204 may communicate with each other at any suitable frequencies.

In FIG. 2, BS 204 sends synchronization signals, BRSs, and system information over a plurality of directional beams 211 in a plurality of directions as shown by the dashed oval 220. To access the network 200, UE 202 listens to the synchronization signals and/or the BRSs and selects a beam for performing a random-access procedure. For example, UE 202 can receive the beams 211a, 211b, and 211c and selects the beam 211b for the random access. The UE 202 sends a random-access preamble over a beam 221 in the beam direction of the beam 211b and monitors for a RAR from BS 204. Upon detecting the random-access preamble, BS 204 sends a RAR over the beam 211b in the same beam direction at which the random-access preamble is received. The BS 204 sends the RAR over the beam 211b using an entire subframe. This can be resource inefficient when a large bandwidth is available. In addition, by the time BS 204 sends the RAR, UE 202 may have moved to a different location away from the beam 211b as shown by the dashed arrows. Thus, UE 202 may fail to receive the RAR from the beam 211b. An additional cause of RAR failure may be due to beam correspondence. Although UE 202 may retry for another random-access attempt after waiting for a period of time (e.g., a backoff period), the retry adds additional latency. Thus, sending a single random-access preamble over a single beam direction per random access attempt may not be robust enough to successfully complete the RACH procedure.

FIG. 3 illustrates a transmission scenario of a 2-step RACH scheme between a UE 202 and a BS 204 that may be implemented in the wireless communication network shown in FIGS. 1-2, according to some aspects of the present disclosure.

Diagram 300 in FIG. 3 shows a 2-step RACH procedure that lowers the access delay in the control plane as compared to the traditional 4-step RACH. The system information block (e.g., SIB2) and RRC signaling is transmitted to UE 202 from BS 204 at 315, and UE 202 decodes the system information and RRC signaling, which may contain resource allocation information relating to the RACH occasions and/or PUSCH occasions for the 2-step RACH or 4-step RACH at 320. UE 202 then transmits a Msg A that includes the 4-step RACH Msg 1 and Msg 3, e.g., including a random-access preamble 340a transmitted over a RACH occasion followed by the payload 340b for the random-access message (connection request, device ID, buffer status report, etc.) transmitted over a PUSCH occasion at 340. UE 202 then monitors for a Msg B from BS 204 at 345 while BS 204 processes and decodes Msg A at 350. The MsgB is transmitted from BS 204, which corresponds to the Msg 2 and Msg 4 of 4-step RACH, e.g., the RAR, timing advance and finally the connection complete with RRC response message at 355. Thus, the 2-step RACH is able to set up a connection between UE 202 and BS 204 for UE 202 to start transmitting uplink data with a reduced access delay, e.g., 2 message exchange vs. traditional 4 message exchange.

As shown at 340, the preamble 340a of the MsgA is transmitted over a RACH occasion, and the payload 340b of the MsgA is transmitted over a PUSCH occasion. The network defines the RACH occasions and PUSCH occasions for the 2-step RACH, and transmits information relating to the occasions to the UE via RMSI, other system information, or RRC messages. When the UE 202 is compatible with both 2-step RACH and 4-step RACH, the UE 202 may receive occasion allocation information relating to the 2-step RACH and the 4-step RACH. Existing systems may use the same PRACH configuration table that was defined for the 4-step RACH to assign RACH occasions for the 2-step RACH. As there is a limited number of rows in the table, the RACH occasion for a 2-step RACH may collide in time-frequency with that of a 4-step RACH even when they were intended to be separate ones (i.e., without preamble partitioning). The collision may result in serious logic confusions, e.g., a gNB may have to respond with a msg2 in 4-step RACH and a msgB in a 2-step RACH for a detected preamble.

Existing agreement in 3GPP include certain rules for a UE to invalidate a 2-step RACH occasion following the same rules that are used for the invalidation of 4-step RACH occasions when a collision occurs, which can be found be section 8.1 of TS 38.213. However, no existing agreement has been reached to manage the situation when a PUSCH occasion defined for the 2-step RACH collides with other occasions, e.g., the RACH occasion defined for the 2-step RACH or the RACH occasion defined for the 4-step RACH.

In view of the need to manage the transmission occasions, embodiments described herein, as further described in relation to FIGS. 6-11, provide ways to validate a PUSCH occasion defined for 2-step RACH in case of collisions. Such collision may not always happen (i.e., not expected by a UE) with careful PUSCH occasion allocation. However, a sophisticated/complete design of PUSCH occasion allocation may not always be realized due to the tight schedule of 3GPP. In some implementations, a PUSCH occasion may need to be validated together, or separately, with the corresponding RACH occasion. For example, the UE may determine whether a collision occurs between the PUSCH occasion for the 2-step RACH and any RACH occasion assigned for either 2-step RACH or 4-step RACH after receiving the RACH configuration or updates from the network. The UE may then exclude the PUSCH occasion from the resource pool for 2-step RACH when a collision occurs.

Figure 4:
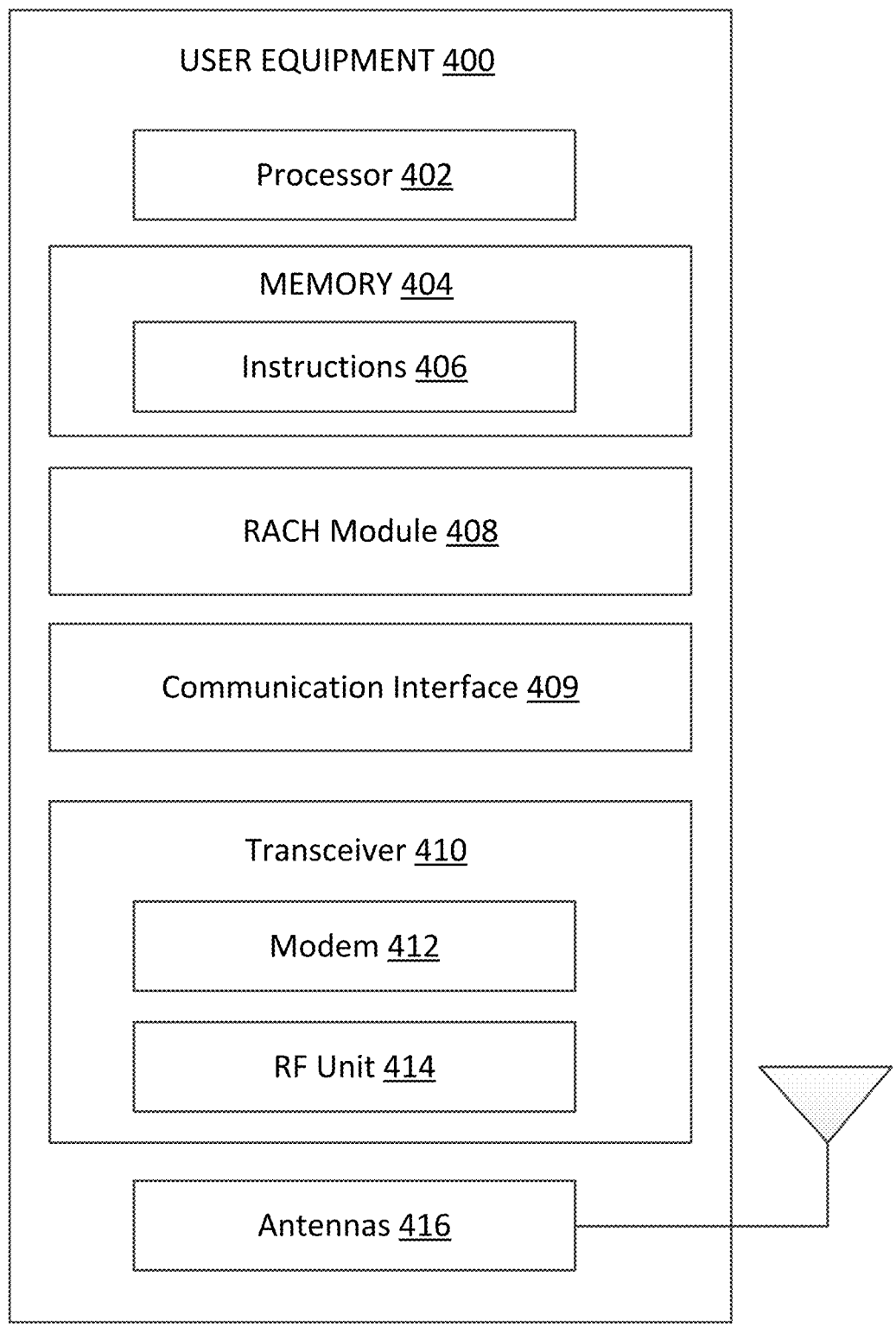
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or UE 202 shown in other figures, for example. As shown, the UE 400 may include a processor 402, a memory 404, a BWP hopping module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The RACH module 408 may communicate with the communication interface 409 to receive from or transmit messages to another device. Each of the RACH module 408 and the communication interface 409 may be implemented via hardware, software, or combinations thereof. For example, each of the RACH module 408 and the communication interface 409 may be implemented as a processor, circuit, and/or instructions 406 stored in the memory 404 and executed by the processor 402. In some examples, the RACH module 408 and the communication interface 409 can be integrated within the modem subsystem 412. For example, the RACH module 408 and the communication interface 409 can be implemented by a combination of software components (e.g., executed by a DSP or a general processor) and hardware components (e.g., logic gates and circuitry) within the modem subsystem 412. In some examples, a UE may include one of the RACH module 408 and the communication interface 409. In other examples, a UE may include both the RACH module 408 and the communication interface 409.

The RACH module 408 and the communication interface 409 may be used for various aspects of the present disclosure, for example, aspects of FIGS. 3 and 6-11. The RACH module 408 is configured to receive from a BS (e.g., 204) system information that includes definitions of RACH occasions and PUSCH occasions for initiating a RACH procedure. The RACH module 408 is further configured to validate or invalidate the RACH occasions and/or the PUSCH occasions before transmitting MsgA including a random-access preamble and a payload containing a connection request to the BS.

The communication interface 409 is configured to coordinate with the RACH module 408 to receive system information, MsgB and/or other DL scheduling grants from the BS, and/or communicate with the BS according to the UL and/or DL scheduling grants. The communication interface 409 is further configured to transmit MsgA, and/or other UL data to the BS.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the RACH module 408, and/or the communication interface 409 according to a modulation and coding scheme (MCS), e.g., a low-density parity check (LDPC) coding scheme, a turbo coding scheme, a convolutional coding scheme, a digital beamforming scheme, etc.

The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the RACH module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
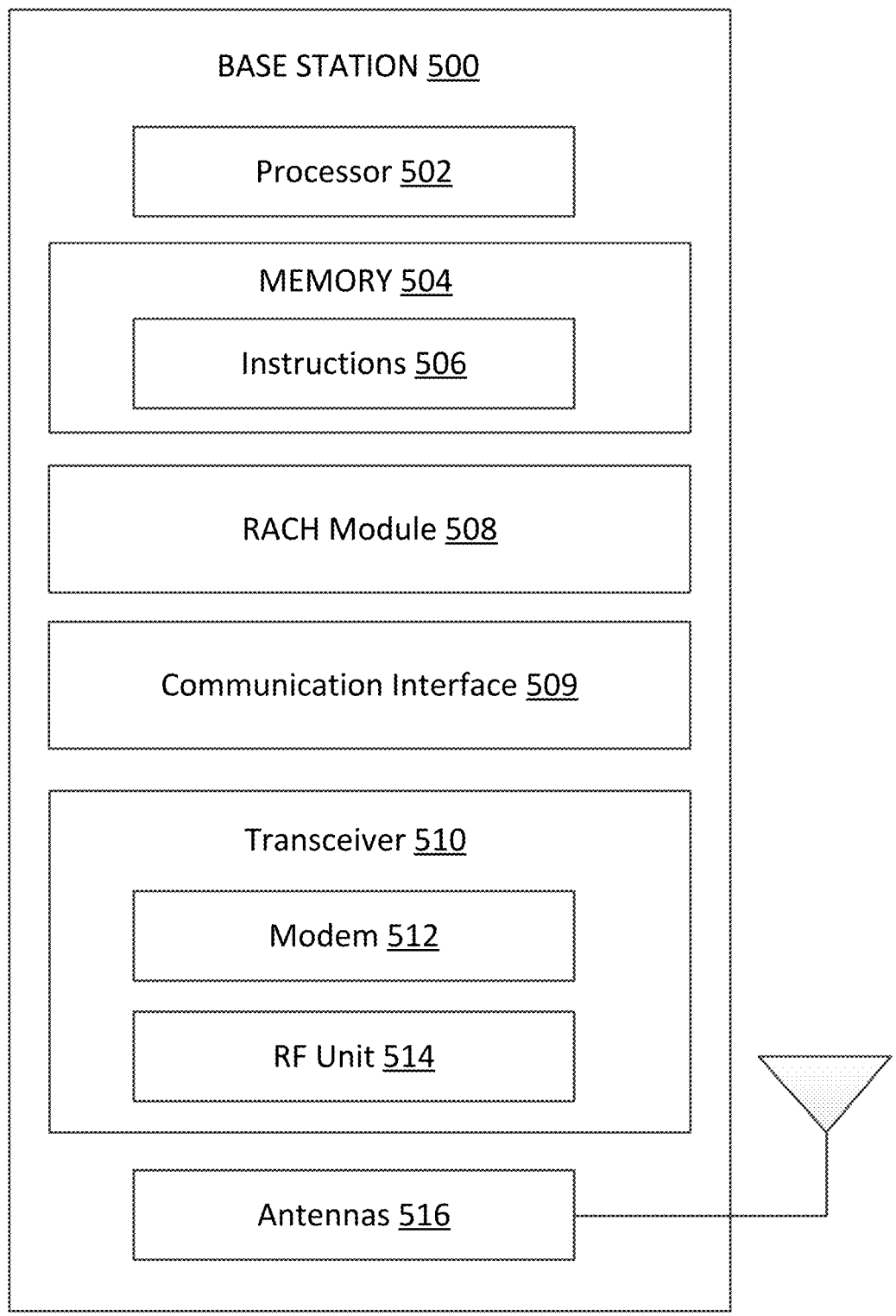
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a RACH module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The RACH module 508 may communicate with the communication interface 509 to receive from or transmit messages to another device. Each of the RACH module 508 and the communication interface 509 may be implemented via hardware, software, or combinations thereof. For example, each of the RACH module 508 and the communication interface 509 may be implemented as a processor, circuit, and/or instructions 506 stored in the memory 504 and executed by the processor 502. In some examples, the RACH module 508 and the communication interface 509 can be integrated within the modem subsystem 512. For example, the RACH module 508 and the communication interface 509 can be implemented by a combination of software components (e.g., executed by a DSP or a general processor) and hardware components (e.g., logic gates and circuitry) within the modem subsystem 512. In some examples, a UE may include one of the RACH module 508 and the communication interface 509. In other examples, a UE may include both the RACH module 508 and the communication interface 509.

The RACH module 508 and the communication interface 509 may be used for various aspects of the present disclosure, for example, aspects of FIGS. 3 and 6-11. The RACH module 508 is configured to broadcast system information that includes definitions of RACH occasions and PUSCH occasions for initiating a random-access channel procedure. The RACH module 508 is further configured to receive MsgA including a random-access preamble received over the RACH occasion and a payload containing a connection request received over the PUSCH occasion.

The communication interface 509 is configured to coordinate with the RACH module 508 to broadcast system information, or to transmit MsgB to the UE. The communication interface 509 is further configured to receive MsgA or other UL data from the UE.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the RACH module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
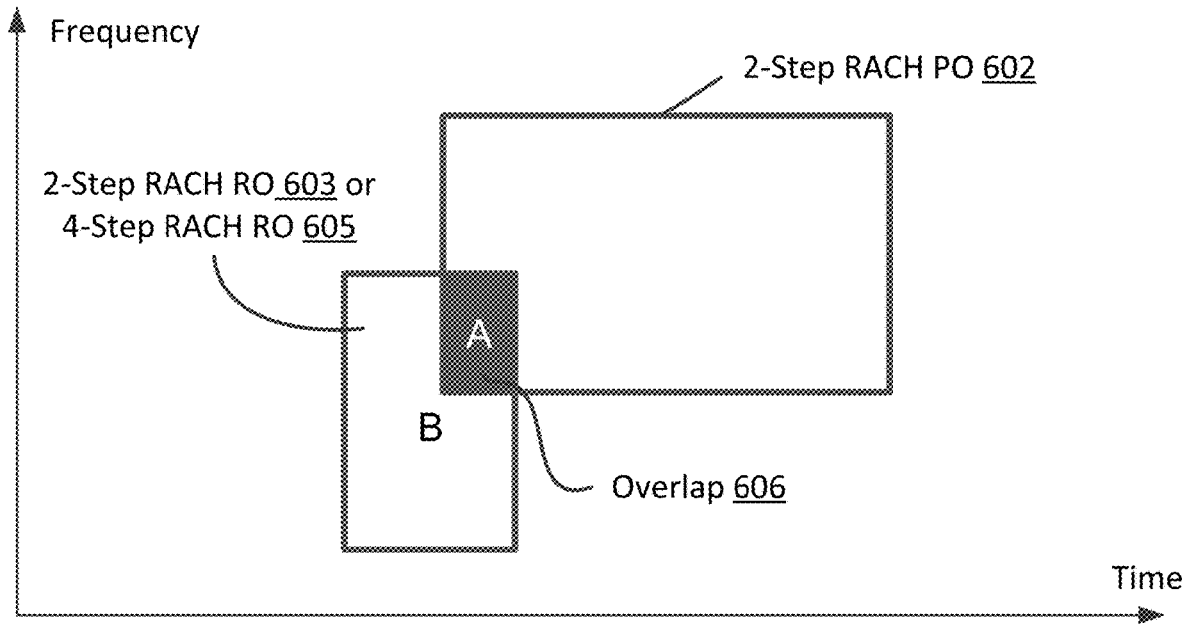
FIG. 6 illustrates a diagram showing a collision between the 2-step RACH PUSCH occasion and the 2-step or 4-step RACH occasion, according to some aspects of the present disclosure.

FIG. 6 illustrates a diagram showing a collision between the 2-step RACH PUSCH occasion and the 2-step or 4-step RACH occasion, according to some aspects of the present disclosure. For example, a collision in time and frequency between the PUSCH occasion 602 for the 2-step RACH and the RACH occasion 603 for the 2-step RACH or the RACH occasion 605 for the 4-step RACH happens when the two occasions 602 and 603, or 602 and 605 overlap over at least one OFDM symbol (in time)×one sub-carrier spacing (in frequency). That is, as illustrated by the area labeled as "A," when the overlapping area "A" has a non-zero area.

In some embodiments, when the collision happens, for 2-step RACH, PUSCH occasion 602 is first validated with the SSB and the downlink pattern in TDD, e.g., following the procedure as described in Section 8.1 of TS38.213. A PUSCH occasion 602 for 2-step RACH is then validated with the 4-step RACH occasion 605 and the 2-step RACH occasion 603. The PUSCH occasion 602 is invalid if it collides with either RACH occasion 603 or 605. The invalid PUSCH occasion is not considered in any association between the SSB and 2-step RACH occasion/PUSCH occasion pairs, e.g., being excluded from the RACH resource pool.

In some embodiments, for 2-step RACH, PUSCH occasion 602 may only be validated with the SSB and the downlink pattern in TDD, e.g., fowling the procedure as described in Section 8.1 of TS38.213. In this case, the UE replies on a careful design of occasion allocation and does not expect the PUSCH occasion 602 for 2-step RACH to collide with the RACH occasions 603 or 605 for the 2-step RACH or 4-step RACH.

In some embodiments, the PUSCH occasion 602 is considered to collide with the RACH occasions 603 or 605 when the overlapping area A is greater than a threshold portion of area B (the total area of the RACH occasions 603 or 604), e.g., 10%, 15%, etc. The threshold ratio may be defined by the network in guiding the validation procedure of the UE and may be transmitted to the UE via system information or RRC messages.

Figure 7:
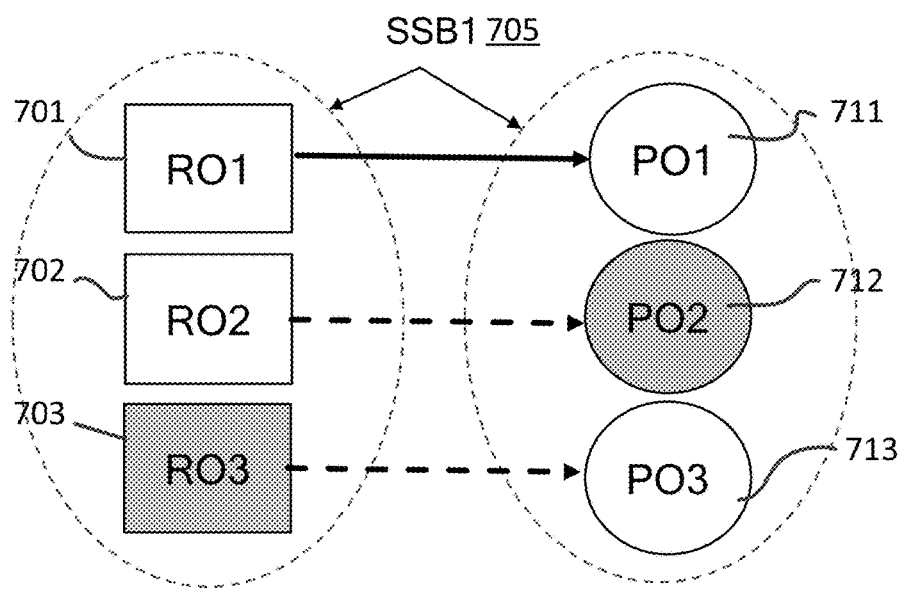
FIG. 7 illustrates a diagram showing aspects of managing transmission occasions for the 2-step RACH PUSCH occasion through the PUSCH occasion to RACH occasion association, according to some aspects of the present disclosure.

FIG. 7 illustrates a diagram showing aspects of managing transmission occasions for the 2-step RACH PUSCH occasion through the PUSCH occasion 711-713 to RACH occasion association 701-703, according to some aspects of the present disclosure. For 2-step RACH occasion/PUSCH occasion association with SSB, the UE may independently conduct SSB association with valid 2-step RACH occasions, and SSB association with valid PUSCH occasions. For example, the UE may associate SSB 705 with RACH occasions 701-703, and independently associate SSB 705 with PUSCH occasions 711-713, if the occasions 701-703 and 711-713 are valid with respect to the collision scenario described in relation to FIG. 6. Then the RACH occasions and PUSCH occasions associated with the same SSB(s) are further associated using the association rule defined by network. For example, here, as RACH occasions 701-703 and PUSCH occasions 711-713 are all associated with SSB 705. RACH occasion 701, 702, 703 may be associated PUSCH occasion 711, 712, 713, respectively, as pairs.

If no association between the PUSCH occasion and RACH occasion, using the association rule defined by network, can be established for a valid RACH occasion or a valid PUSCH occasion, the PUSCH occasion or the RACH occasion is excluded from the 2-step RACH resource pool. For example, as illustrated by the solid line between RACH occasion 701 and PUSCH occasion 711, when both RACH occasion 701 and PUSCH occasion 711 are valid (e.g., not colliding with other RACH or PUSCH occasion), and are both associated with the same SSB 705, RACH occasion 701 and PUSCH occasion 711 are then considered valid occasion pair for MsgA transmission. For another example, if either a PUSCH occasion (e.g., 712) or a RACH occasion (e.g., 703) is invalid, e.g., invalidated with SSB 705 or the downlink pattern in TDD, or colliding with another RACH occasion, as shown by the dashed line between occasions 702 and 712, 703 and 713, respectively, the invalid PUSCH occasion 712 or the invalid RACH occasion 703 are to be excluded from the RACH resource pool, and thus will not be used to form the transmission occasion pair with RACH occasion 702, or PUSCH occasion 713, respectively.

In an alternative embodiment, instead of first determining whether a PUSCH or RACH occasion is valid, the UE may first associate the 2-step RACH occasion and PUSCH Occasion using the association rule from the network, e.g., forming the occasion pairs 701-712, 702-712 and 703-713. The UE may then run validation on the RACH occasions 701-703 and PUSCH occasions 711-713, e.g., following similar procedure described in relation to FIG. 6. If either a RACH occasion (e.g., 703) or a PUSCH occasion (e.g., 712) is invalid, the occasion pair (e.g., 702-712, 703-713) for 2-step RACH is invalid and will be excluded from RACH resource pool.

In this way, each SSB (e.g., 705) is associated with the set of valid occasion pairs, e.g., the pair of RACH occasion 701 and PUSCH occasion 711.

Figure 8:
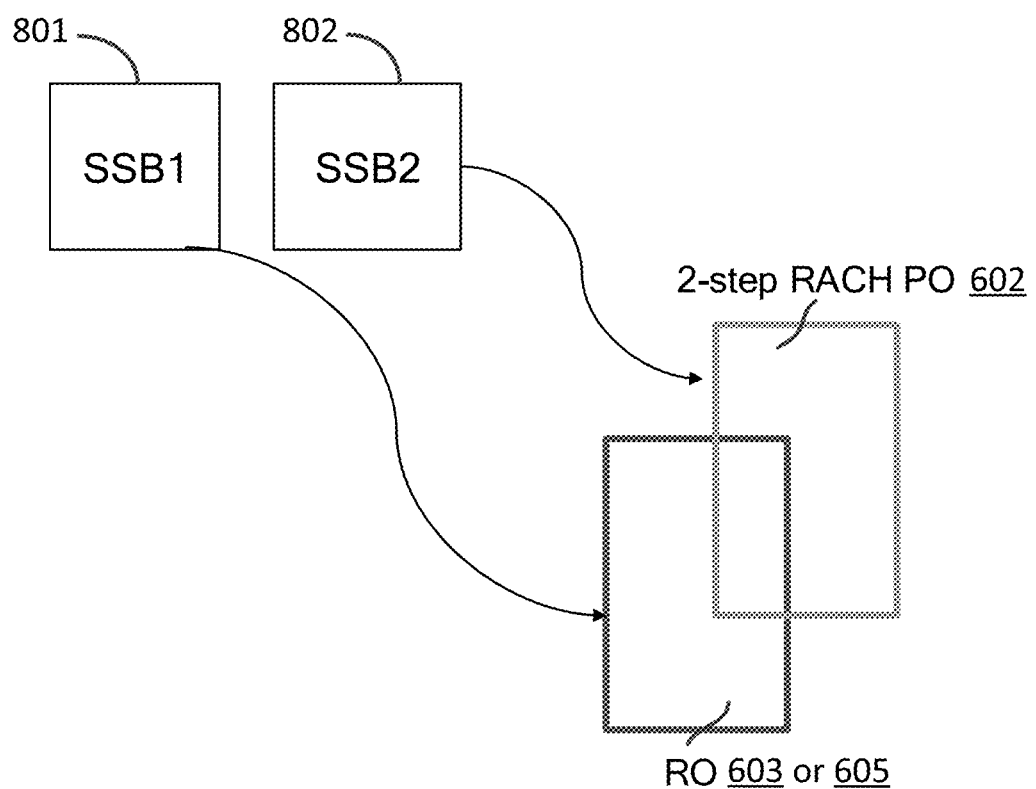
FIG. 8 provides a diagram illustrating a scenario where a PUSCH occasion for 2-step RACH is considered valid if the PUSCH occasion only collides with a RACH occasion that is associated to a different SSB, according to some embodiments of the present technology.

FIG. 8 provides a diagram illustrating a scenario where a PUSCH occasion for 2-step RACH is considered valid if the PUSCH occasion only collides with a RACH occasion that is associated to a different SSB, according to some embodiments of the present technology. For example, even if the PUSCH occasion 602 for 2-step RACH is determined to collide with the RACH occasion 603 or 605 shown in FIG. 6, but if PUSCH occasion 602 is associated with SSB 802 that is different from the SSB 801 that is associated with the colliding RACH occasion 603 or 605, the PUSCH occasion 602 is still considered valid for MsgA transmission.

Figure 9:
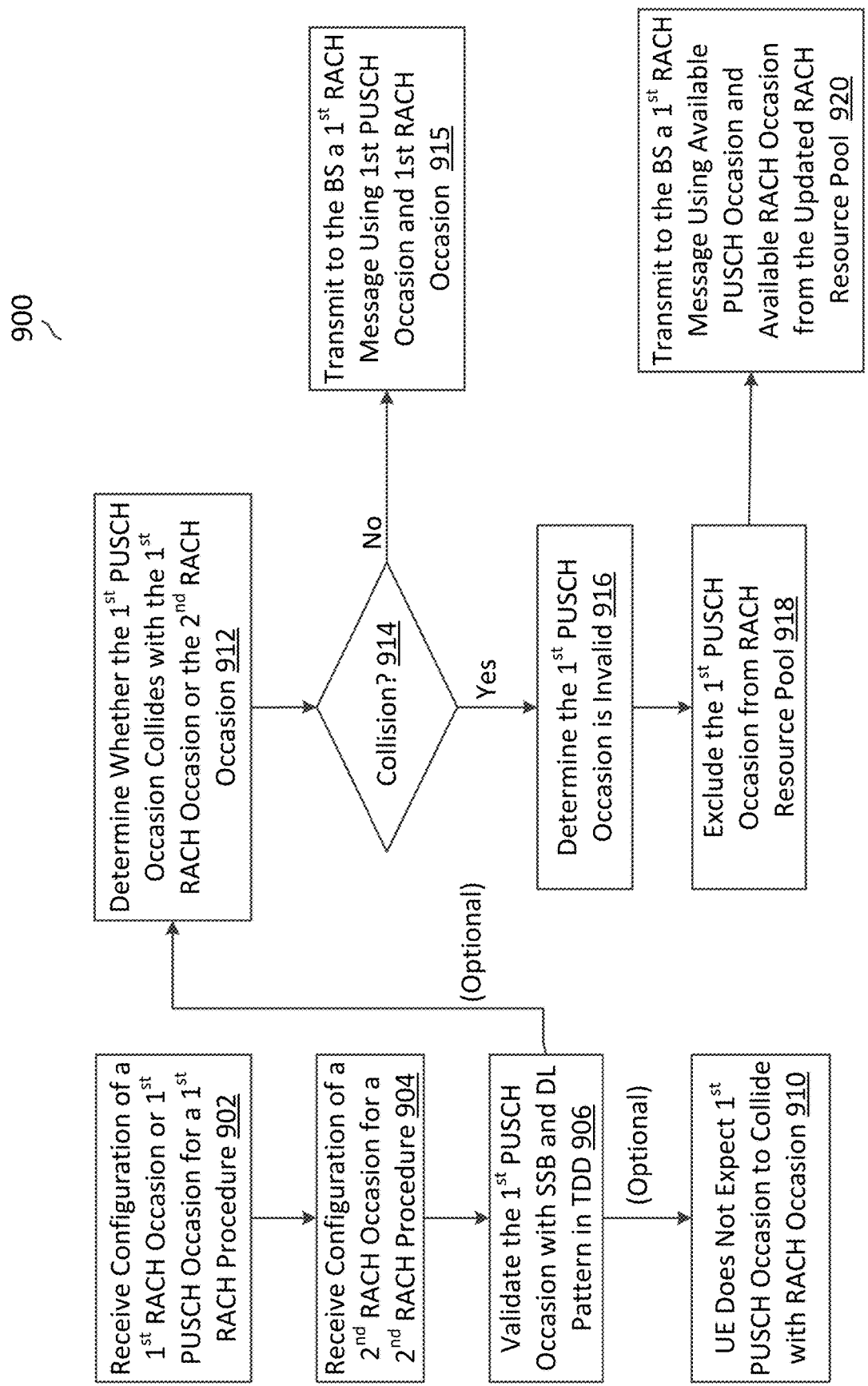
FIG. 9 illustrates a logic flow performed by the UE corresponding to the validation procedure of PUSCH occasion for 2-step RACH described in relation to FIG. 6, according to some aspects of the present disclosure.

FIG. 9 illustrates a logic flow performed by the UE corresponding to the validation procedure of PUSCH occasion 602 for 2-step RACH described in relation to FIG. 6, according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the RACH module 408, the communication interface 409, the transceiver 410, the modem 412, and the one or more antennas 416, to execute the steps of method 900. As illustrated, the method 900 includes a number of enumerated steps, but aspects of the method 900 include additional steps before, after, and in between the enumerated steps. In some aspects, one or more of the enumerated steps may be omitted or performed in a different order.

At step 902, the UE may receive configuration of a first RACH occasion or a first PUSCH occasion for a first RACH procedure. For example, the UE may receive RACH/PUSCH occasion for the 2-step RACH, e.g., via RMSI, other system information or RRC messages from the BS.

At step 904, the UE may receive configuration of a second RACH occasion for a second RACH procedure. For example, the UE may also receive RACH/PUSCH occasion for the 4-step RACH.

At step 906, the UE may validate the PUSCH occasion with SSB and downlink pattern in TDD. For example, the UE may validate the PUSCH occasion for 2-step RACH with SSB or downlink pattern in TDD according to Section 8.1 of TS38.213.

At step 910, the UE may optionally finish the PUSCH occasion validation as the UE does not expect the PUSCH occasion for 2-step RACH to collide with any RACH occasion.

Or alternatively, at step 912, the UE may determine whether the first PUSCH occasion (e.g., 602) collide with the first RACH occasion (e.g., 603) or the second RACH occasion (e.g., 605). For example, the UE may determine whether the first PUSCH occasion overlaps with the first or second RACH occasion at all, and/or whether the overlapping area is greater than a threshold portion of the first or second RACH occasion.

At step 914, if a collision is found, method 900 proceeds to step 916 to determine that the first PUSCH occasion is invalid, and then the first PUSCH occasion is excluded from the RACH resource pool at step 918. At step 920, the UE may transmit MsgA to the BS using available PUSCH occasions and RACH occasions selected from the updated RACH resource pool.

At step 914, if no collision is found, method 900 proceeds to step 915 to transmit to the BS MsgA using the first PUSCH occasion (for the payload) and the first RACH occasion (for the preamble).

Figure 10:
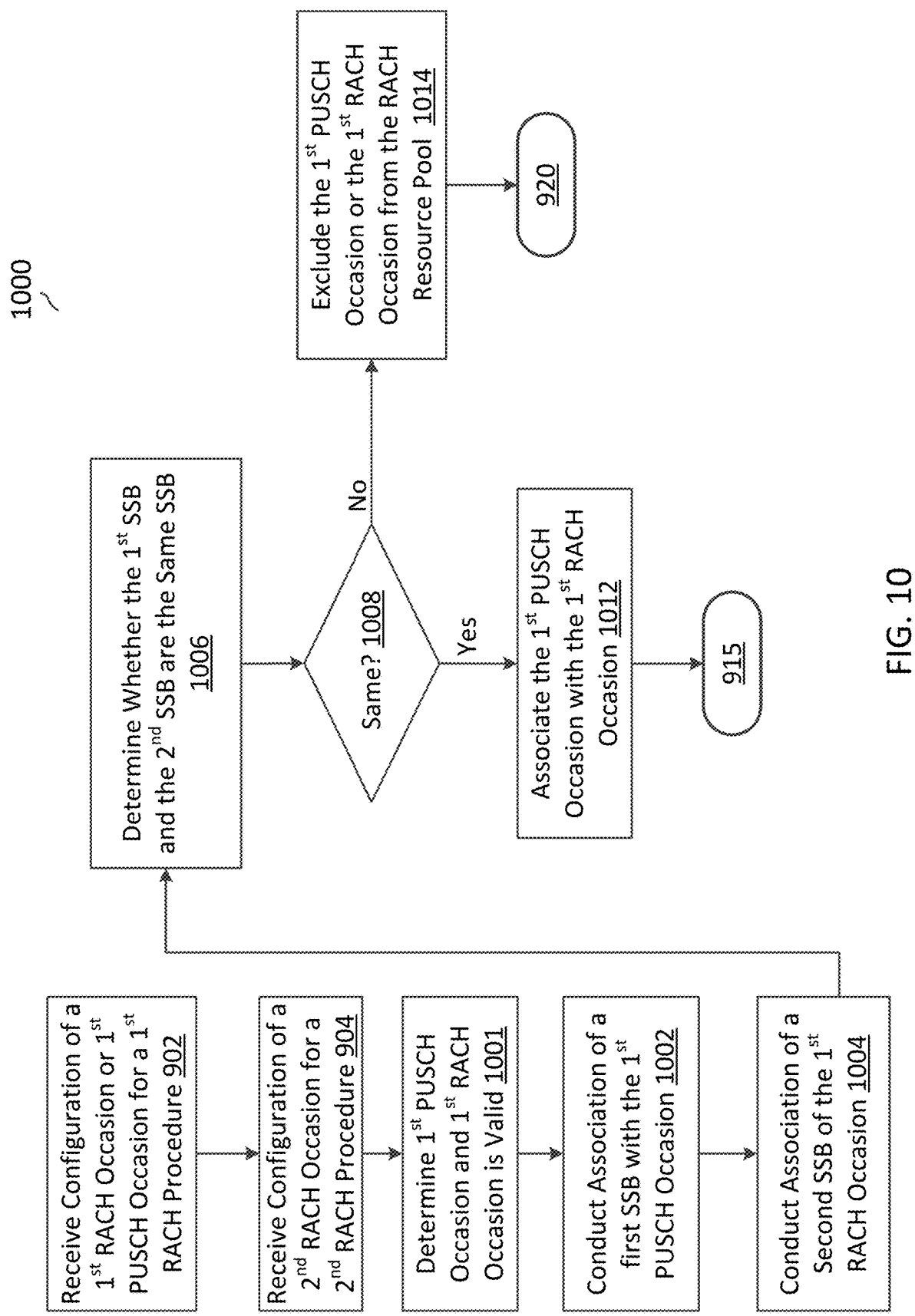
FIG. 10 illustrates a logic flow performed by the UE corresponding to the validation procedure of PUSCH occasion for 2-step RACH described in relation to FIG. 7, according to some aspects of the present disclosure.

FIG. 10 illustrates a logic flow performed by the UE corresponding to the validation procedure of PUSCH occasion 602 for 2-step RACH described in relation to FIG. 7, according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the RACH module 408, the communication interface 409, the transceiver 410, the modem 412, and the one or more antennas 416, to execute the steps of method 1000. As illustrated, the method 1000 includes a number of enumerated steps, but aspects of the method 1000 include additional steps before, after, and in between the enumerated steps. In some aspects, one or more of the enumerated steps may be omitted or performed in a different order.

At step 1001, continued from step 904 in FIG. 9, the UE determines the first PUSCH occasion and the first RACH occasion is valid. For example, the UE may follow method 900 in FIG. 9 to determine that the PUSCH occasion for 2-step RACH is valid.

At step 1002, the UE may conduct an association of a first SSB with the first PUSCH occasion. For example, the UE associates SSB 705 with valid PUSCH occasions 711 and 713 in FIG. 7.

At step 1004, the UE may conduct an association of a second SSB with the first RACH occasion. For example, the UE associates SSB 705 (or other SSBs) with valid RACH occasions 701 and 702 in FIG. 7.

At step 1006, the UE determine whether the first SSB and the second SSB are the same. In this example shown in FIG. 7, the same SSB 705 is used.

At step 1008, when the SSBs are the same, method 1000 proceeds to step 1012, at which the first PUSCH occasion is associated with the first RACH occasion, e.g., according to association rules. For example, PUSCH occasion 711 and RACH occasion 701, both of which are valid and are associated with the same SSB, are associated as a PUSCH-RACH occasion pair according to the association rule, as shown in FIG. 7. Method 1000 then proceeds to step 915 in FIG. 9.

At step 1008, if the valid PUSCH occasion and valid RACH occasion do not associate with the same SSB—in other words, the valid PUSCH occasions and valid RACH occasions cannot form a pair as they do not associate with the same SSB. The UE may exclude the first PUSCH occasion or the first RACH occasion from the RACH resource pool at step 1014. Method 1000 then proceeds to step 920 in FIG. 9.

Figure 11:
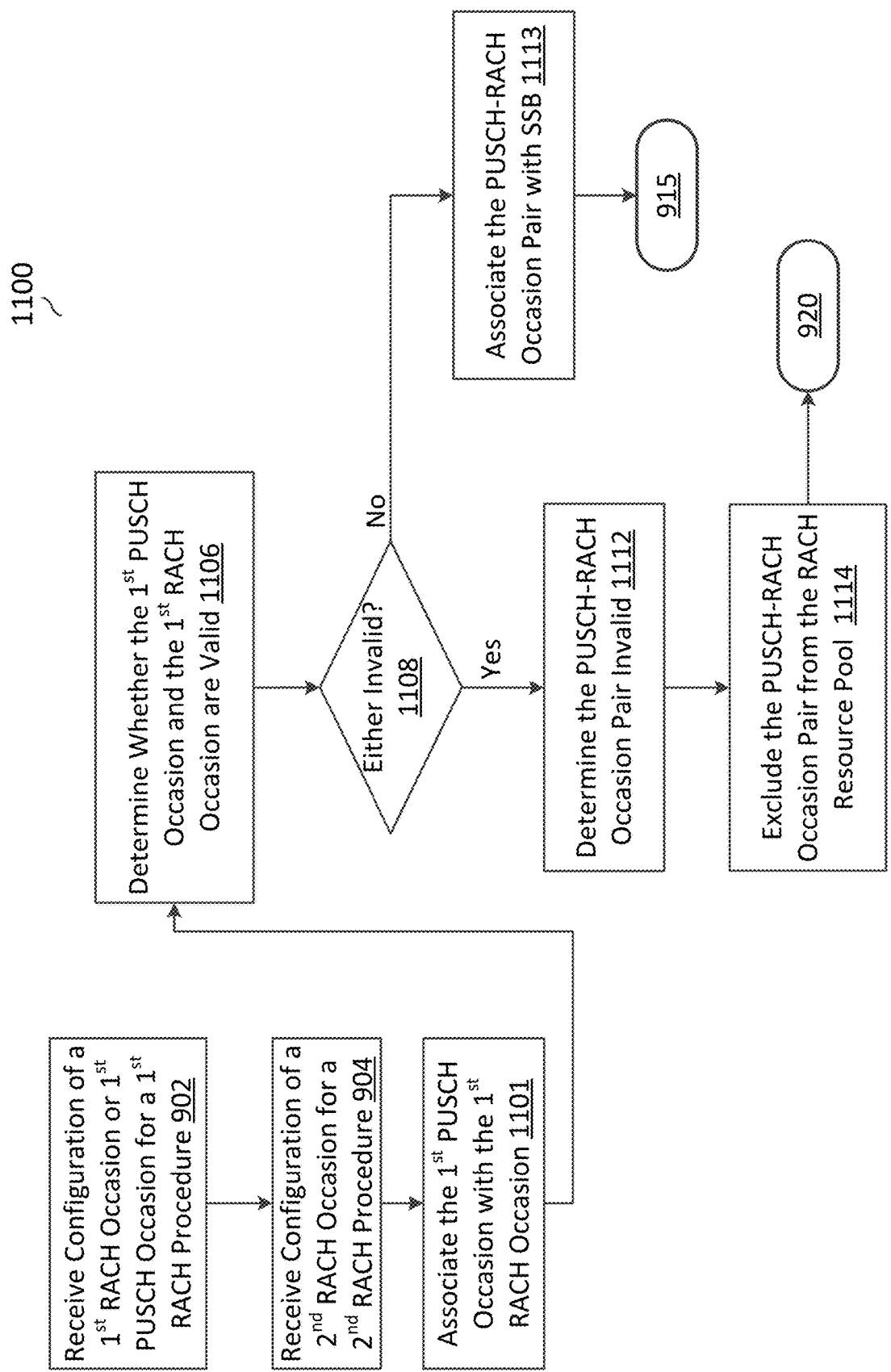
FIG. 11 illustrates an alternative logic flow performed by the UE corresponding to the validation procedure of PUSCH occasion for 2-step RACH described in relation to FIG. 7, according to some aspects of the present disclosure.

FIG. 11 illustrates an alternative logic flow performed by the UE corresponding to the validation procedure of PUSCH occasion 602 for 2-step RACH described in relation to FIG. 7, according to some aspects of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, UE 202 or UE 400, may utilize one or more components, such as the processor 402, the memory 404, the RACH module 408, the communication interface 409, the transceiver 410, the modem 412, and the one or more antennas 416, to execute the steps of method 1100. As illustrated, the method 1100 includes a number of enumerated steps, but aspects of the method 1100 include additional steps before, after, and in between the enumerated steps. In some aspects, one or more of the enumerated steps may be omitted or performed in a different order.

At step 1101, continuing on from step 904 in FIG. 9, the UE may associate the first PUSCH occasion with a first RACH occasion according to an association rule. For example, the UE may associate PUSCH occasion 711 with RACH occasion 701, PUSCH occasion 712 with RACH occasion 702, and PUSCH occasion 713 with RACH occasion 703 for 2-step RACH.

At step 1106, the UE may determine whether the first PUSCH occasion and the first RACH occasion are valid, e.g., following method 900 of FIG. 9.

At step 1108, when either the PUSCH or the RACH occasion is invalid, method 1100 proceeds to step 1112, at which the UE determines that the PUSCH-RACH occasion pair is invalid. For example, as shown in FIG. 7, when PUSCH occasion 712 is invalid, the PUSCH-RACH occasion pair 712-702 is deemed invalid. When RACH occasion 703 is invalid, the PUSCH-RACH occasion pair 713-703 is deemed invalid.

At step 1114, the UE may exclude the invalid PUSCH-RACH pair from the RACH resource pool, and then method 1100 proceeds to step 920 in FIG. 9.

At step 1108, when neither the PUSCH nor the RACH occasion is invalid, method 1100 proceeds to step 1113, at which the PUSCH-RACH occasion pair is associated with a SSB. For example, the valid PUSCH-RACH occasion pair 711-701 is associated with SSB 705. Method 1100 then proceeds to step 915 in FIG. 9.

In some embodiments, if an update is received from the network (e.g., BS 204) that may impact RACH, including any change in 2-step RACH occasion to PUSCH occasion association rule, SSB to RACH occasion association rule, SSB to PUSCH occasion association rule, SSB to MsgA occasion association rule, SSB timing/arrangement, TDD uplink-downlink pattern, and/or the like, the UE may re-validate the PUSCH occasion for 2-step RACH as described in FIGS. 6-11, following the updated rules.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
   receiving, at a user equipment (UE) from a base station (BS), a first configuration of a first random-access channel (RACH) occasion or a first physical uplink shared channel (PUSCH) occasion for a first RACH procedure and a second configuration of a second RACH occasion for a second RACH procedure;
   determining whether the first PUSCH occasion is valid depending at least in part on whether the first PUSCH occasion collides with the first RACH occasion or the second RACH occasion, wherein the determining comprises:
   determining that the first PUSCH occasion is invalid when the first PUSCH occasion overlaps with the first RACH occasion or the second RACH occasion in time and frequency for more than a threshold ratio portion of the first RACH occasion or the second RACH occasion;
   excluding the first PUSCH occasion from a resource pool for a 2-step RACH procedure in response to determining that the first PUSCH occasion is invalid; and
   transmitting, to the BS, a first RACH message using available PUSCH occasions and available RACH occasions, wherein the available PUSCH occasions are selected from the resource pool that does not contain the excluded first PUSCH occasions.

2. The method of claim 1, wherein the determining whether the first PUSCH occasion or the first RACH occasion is valid comprises:
   validating the first PUSCH occasion with a synchronization signal block (SSB) and a downlink pattern defined in a time division duplexing (TDD) mode.

3. The method of claim 1, wherein the determining whether the first PUSCH occasion or the first RACH occasion is valid further comprises:
   determining that the first PUSCH occasion is valid in response to determining that an overlapping area between the first PUSCH occasion and the first RACH occasion or the second RACH occasion is smaller than the threshold ratio portion of the first RACH occasion or the second RACH occasion.

4. The method of claim 1, further comprising:
   determining that the first PUSCH occasion is invalid; and
   excluding the first PUSCH occasion when associating a synchronization signal block (SSB) with PUSCH occasions and RACH occasions for the first RACH procedure.

5. The method of claim 1, further comprising:
   determining that the first PUSCH occasion or the first RACH occasion is valid;
   associating a first SSB with the first PUSCH occasion;
   associating a second SSB with the first RACH occasion;
   associating the first PUSCH occasion and the first RACH occasion according to an association rule defined by a network, in response to determining that the first SSB and the second SSB are a same SSB;
   excluding the first PUSCH occasion or the first RACH occasion from a RACH resource pool in response to determining that the first SSB and the second SSB are different.

6. The method of claim 1, further comprising:
   associating a first SSB with the first PUSCH occasion;

associating a second SSB with the first RACH occasion;

associating the first PUSCH occasion and the first RACH occasion according to an association rule defined by a network, in response to determining that the first SSB and the second SSB are a same SSB;

determining that the first PUSCH occasion or the first RACH occasion is invalid; and re-associating the first SSB or the second SSB with a valid PUSCH occasion and a valid RACH occasion selected from a RACH resource pool.

7. The method of claim 1, further comprising:

receiving, from the BS, an update including a change in RACH configuration parameters; and re-validating the first RACH occasion or the first PUSCH occasion according to the change in RACH configuration parameters.

8. The method of claim 1, wherein the determining whether the first PUSCH occasion or the first RACH occasion is valid comprises:

determining that the first PUSCH occasion collides with the first RACH occasion or the second RACH occasion;

determining that the first PUSCH occasion is associated with a first SSB, and the first RACH occasion or the second RACH occasion that collides with the first PUSCH is associated with a second SSB; and determining that the first PUSCH occasion is valid in response to determining that the first SSB is different from the second SSB.

9. The method of claim 1, wherein the first RACH procedure is a 2-step RACH procedure, and the second RACH procedure is a 4-step RACH procedure.

10. A user equipment (UE) of wireless communication, comprising:

a transceiver configured to:

receive, from a base station (BS), a first configuration of a first random-access channel (RACH) occasion or a first physical uplink shared channel (PUSCH) occasion for a first RACH procedure and a second configuration of a second RACH occasion for a second RACH procedure;

a processor configured to:

determine whether the first PUSCH occasion is valid depending at least in part on whether the first PUSCH occasion collides with the first RACH occasion or the second RACH occasion, wherein the determining comprises:

determining that the first PUSCH occasion is invalid when the first PUSCH occasion overlaps with the first RACH occasion or the second RACH occasion in time and frequency for more than a threshold ratio portion of the first RACH occasion or the second RACH occasion;

exclude the first PUSCH occasion from a resource pool in response to determining that the first PUSCH occasion is invalid; and wherein the transceiver is configured to transmit to the BS, a first RACH message using available PUSCH occasions and available RACH occasions selected from the resource pool that does not contain the excluded first PUSCH occasions.

11. The UE of claim 10, wherein the processor is configured to determine whether the first PUSCH occasion or the first RACH occasion is valid by:

validating the first PUSCH occasion with a synchronization signal block (SSB) and a downlink pattern defined in a time division duplexing (TDD) mode.

12. The UE of claim 10, wherein the processor is configured to determine whether the first PUSCH occasion or the first RACH occasion is valid by:

determining that the first PUSCH occasion is valid in response to determining that an overlapping area between the first PUSCH occasion and the first RACH occasion or the second RACH occasion is smaller than the threshold ratio portion of the first RACH occasion or the second RACH occasion.

13. The UE of claim 10, wherein the processor is further configured to:

determining that the first PUSCH occasion is invalid; and excluding the first PUSCH occasion when associating a synchronization signal block (SSB) with PUSCH occasions and RACH occasions for the first RACH procedure.

14. The UE of claim 10, wherein the processor is further configured to:

determine that the first PUSCH occasion or the first RACH occasion is valid;

associate a first SSB with the first PUSCH occasion;

associate a second SSB with the first RACH occasion;

associate the first PUSCH occasion and the first RACH occasion according to an association rule defined by a network, in response to determining that the first SSB and the second SSB are a same SSB; and exclude the first PUSCH occasion or the first RACH occasion from a RACH resource pool in response to determining that the first SSB and the second SSB are different.

15. The UE of claim 10, wherein the processor is further configured to:

associate a first SSB with the first PUSCH occasion;

associate a second SSB with the first RACH occasion;

associate the first PUSCH occasion and the first RACH occasion according to an association rule defined by a network, in response to determining that the first SSB and the second SSB are a same SSB;

determine that the first PUSCH occasion or the first RACH occasion is invalid; and re-associate the first SSB or the second SSB with a valid PUSCH occasion and a valid RACH occasion selected from a RACH resource pool.

16. The UE of claim 10, wherein the processor is further configured to:

receive, from the BS, an update including a change in RACH configuration parameters; and re-validate the first RACH occasion or the first PUSCH occasion according to the change in RACH configuration parameters.

17. The UE of claim 10, wherein the processor is further configured to determine whether the first PUSCH occasion or the first RACH occasion is valid by:

determining that the first PUSCH occasion collides with the first RACH occasion or the second RACH occasion;

determining that the first PUSCH occasion is associated with a first SSB, and the first RACH occasion or the second RACH occasion that collides with the first PUSCH is associated with a second SSB; and determining that the first PUSCH occasion is valid in response to determining that the first SSB is different from the second SSB.

18. The UE of claim 10, wherein the first RACH procedure is a 2-step RACH procedure, and the second RACH procedure is a 4-step RACH procedure.

19. A processor-readable non-transitory storage medium storing processor-executable instructions for a user equipment (UR) of wireless communication, the instructions being executable by a processor to perform operations comprising:
  receiving, at a user equipment (UE) from a base station (BS), a first configuration of a first random-access channel (RACH) occasion or a first physical uplink shared channel (PUSCH) occasion for a first RACH procedure and a second configuration of a second RACH occasion for a second RACH procedure;
  determining whether the first PUSCH occasion is valid depending at least in part on whether the first PUSCH occasion collides with the first RACH occasion or the second RACH occasion, wherein the determining comprises:
    determining that the first PUSCH occasion is invalid when the first PUSCH occasion overlaps with the first RACH occasion or the second RACH occasion in time and frequency for more than a threshold ratio portion of the first RACH occasion or the second RACH occasion;
  excluding the first PUSCH occasion from a resource pool for a 2-step procedure in response to determining that the first PUSCH occasion is invalid; and
  transmitting, to the BS, a first RACH message using available PUSCH occasions and available RACH occasions selected from the resource pool that does not contain the excluded first PUSCH occasions.

20. The medium of claim 19, wherein the operation of determining whether the first PUSCH occasion or the first RACH occasion is valid comprises:
  validating the first PUSCH occasion with a synchronization signal block (SSB) and a downlink pattern defined in a time division duplexing (TDD) mode.

21. The medium of claim 19, wherein the operation of determining whether the first PUSCH occasion or the first RACH occasion is valid further comprises:
  determining that the first PUSCH occasion is valid in response to determining that an overlapping area between the first PUSCH occasion and the first RACH occasion or the second RACH occasion is smaller than the threshold ratio portion of the first RACH occasion or the second RACH occasion.

22. The medium of claim 19, wherein the operation further comprises:
  determining that the first PUSCH occasion is invalid; and
  excluding the first PUSCH occasion when associating a synchronization signal block (SSB) with PUSCH occasions and RACH occasions for the first RACH procedure.

23. The medium of claim 19, wherein the operations further comprise:
  determining that the first PUSCH occasion or the first RACH occasion is valid;
  associating a first SSB with the first PUSCH occasion;
  associating a second SSB with the first RACH occasion;
  associating the first PUSCH occasion and the first RACH occasion according to an association rule defined by a network, in response to determining that the first SSB and the second SSB are a same SSB;
  excluding the first PUSCH occasion or the first RACH occasion from a RACH resource pool in response to determining that the first SSB and the second SSB are different.

24. The medium of claim 19, wherein the operations further comprise:
  associating a first SSB with the first PUSCH occasion;
  associating a second SSB with the first RACH occasion;
  associating the first PUSCH occasion and the first RACH occasion according to an association rule defined by a network, in response to determining that the first SSB and the second SSB are a same SSB;
  determining that the first PUSCH occasion or the first RACH occasion is invalid; and
  re-associating the first SSB or the second SSB with a valid PUSCH occasion and a valid RACH occasion selected from a RACH resource pool.

25. The medium of claim 19, wherein the operations further comprise:
  receiving, from the BS, an update including a change in RACH configuration parameters; and
  re-validating the first RACH occasion or the first PUSCH occasion according to the change in RACH configuration parameters.

26. The medium of claim 19, wherein the operation of determining whether the first PUSCH occasion or the first RACH occasion is valid comprises:
  determining that the first PUSCH occasion collides with the first RACH occasion or the second RACH occasion;
  determining that the first PUSCH occasion is associated with a first SSB, and the first RACH occasion or the second RACH occasion that collides with the first PUSCH is associated with a second SSB; and
  determining that the first PUSCH occasion is valid in response to determining that the first SSB is different from the second SSB.

27. The medium of claim 19, wherein the first RACH procedure is a 2-step RACH procedure, and the second RACH procedure is a 4-step RACH procedure.

* * * * *